(12) United States Patent
Collados et al.

(10) Patent No.: US 8,195,102 B2
(45) Date of Patent: Jun. 5, 2012

(54) SYSTEM AND METHOD FOR TRANSMITTING A BASEBAND REAL SIGNAL WITH A NON-CONSTANT ENVELOPE USING A POLAR TRANSMITTER

(75) Inventors: Manel Collados, Aylesford (GB); Melina Apostolidou, Enschede (NL); Ravichandra Karadi, Eindhoven (NL); Gerard Villar Pique, Eindhoven (NL); Jan Van Sinderen, Liempde (NL)

(73) Assignee: NXP B.V., Eindhoven (NL)

( * ) Notice: Subject to any disclaimer, the term of this patent is extended or adjusted under 35 U.S.C. 154(b) by 254 days.

(21) Appl. No.: 12/792,681

(22) Filed: Jun. 2, 2010

(65) Prior Publication Data
US 2011/0300816 A1 Dec. 8, 2011

(51) Int. Cl.
*H04B 1/66* (2006.01)
(52) U.S. Cl. .................................... 455/102; 455/127.1
(58) Field of Classification Search .......... 455/108–113, 455/91, 102, 129, 127.1; 375/308
See application file for complete search history.

(56) References Cited

U.S. PATENT DOCUMENTS
2009/0154598 A1 * 6/2009 Jensen ........................... 375/308

OTHER PUBLICATIONS
John Groe, Polar Transmitters for Wireless Communications, IEEE Communications Magazine, Sep. 2007, p. 58-63.

* cited by examiner

*Primary Examiner* — Christian Hannon

(57) ABSTRACT

A system and method for transmitting a baseband real signal with a non-constant envelope using a polar transmitter involves decomposing a baseband real signal into a non-constant envelope signal of the baseband real signal and a sign signal of the baseband real signal, where the sign signal restores zero crossing regions of the non-constant envelope signal, modulating a carrier signal with the sign signal of the baseband real signal to generate a modulated signal, converting the non-constant envelope signal of the baseband real signal into a voltage signal using a voltage controlled supply regulator, amplifying the modulated signal into an amplified signal based on the voltage signal, and transmitting the amplified signal to an external wireless device.

20 Claims, 8 Drawing Sheets

SYSTEM AND METHOD FOR TRANSMITTING A BASEBAND REAL SIGNAL WITH A NON-CONSTANT ENVELOPE USING A POLAR TRANSMITTER

Embodiments of the invention relate generally to electrical systems and methods and, more particularly, to polar transmitters and methods for transmitting signals using a polar transmitter.

A polar transmitter is a radio frequency (RF) transmitter that implements both magnitude modulation and phase modulation on an input signal. For example, a polar transmitter may apply the phase component of an input signal to a phase locked loop (PLL) and apply the amplitude component of the input signal to a power amplifier.

Power efficiency is one of the most important characteristics of an RF transmitter. For an RF transmitter with a power amplifier, the power efficiency of the RF transmitter is dominated by the power efficiency of the power amplifier. Modulating a baseband real signal with a non-constant envelope typically requires in a non-polar transmitter a linear power amplifier or a nearly-linear power amplifier to preserve envelope information of input signals. However, unlike a non-linear saturated power amplifier, a linear power amplifier or a nearly-linear power amplifier generally cannot achieve a high power efficiency. Instead of a linear power amplifier or a nearly-linear power amplifier, a polar transmitter usually includes a non-linear saturated power amplifier. Envelope information of input signals to a polar transmitter can be restored by changing supply voltage to the polar transmitter. However, output envelope of the non-linear saturated power amplifier need to linearly follow the supply voltage to the polar transmitter.

A system and method for transmitting a baseband real signal with a non-constant envelope using a polar transmitter involves decomposing a baseband real signal into a non-constant envelope signal of the baseband real signal and a sign signal of the baseband real signal, where the sign signal restores zero crossing regions of the non-constant envelope signal, modulating a carrier signal with the sign signal of the baseband real signal to generate a modulated signal, converting the non-constant envelope signal of the baseband real signal into a voltage signal using a voltage controlled supply regulator, amplifying the modulated signal into an amplified signal based on the voltage signal, and transmitting the amplified signal to an external wireless device. By restoring zero crossing regions of the non-constant envelope signal using the sign signal, the switching frequency and the switching losses of the voltage controlled supply regulator can be lowered.

In an embodiment, a method for transmitting a baseband real signal with a non-constant envelope using a polar transmitter includes decomposing a baseband real signal into a non-constant envelope signal of the baseband real signal and a sign signal of the baseband real signal, where the sign signal restores zero crossing regions of the non-constant envelope signal, modulating a carrier signal with the sign signal of the baseband real signal to generate a modulated signal, converting the non-constant envelope signal of the baseband real signal into a voltage signal using a voltage controlled supply regulator, amplifying the modulated signal into an amplified signal based on the voltage signal, and transmitting the amplified signal to an external wireless device.

In another embodiment, a polar transmitter for transmitting a baseband real signal with a non-constant envelope includes a signal decomposer configured to decompose a baseband real signal into a non-constant envelope signal of the baseband real signal and a sign signal of the baseband real signal, where the sign signal restores zero crossing regions of the non-constant envelope signal, a frequency synthesizer configured to provide a carrier signal, a modulator configured to modulate the carrier signal with the sign signal of the baseband real signal to generate a modulated signal, a voltage controlled supply regulator configured to convert the non-constant envelope signal of the baseband real signal into a voltage signal, a power amplifier configured to amplify the modulated signal into an amplified signal based on the voltage signal, and an antenna configured to transmit the amplified signal to an external wireless device.

In another embodiment, a polar transmitter for transmitting a discrete baseband real signal with a non-constant envelope includes a signal decomposer configured to decompose a discrete baseband real signal into a discrete non-constant envelope signal and a discrete sign signal and to decompose the discrete sign signal into multiple discrete control signals, where the multiple discrete control signals restores zero crossing regions of the non-constant envelope signal, a frequency synthesizer configured to provide a carrier signal, a modulator configured to modulate the carrier signal with the sign signal of the baseband real signal to generate a modulated signal, a digital to analog converter configured to convert the discrete non-constant envelope signal into an analog signal, a low pass filter configured to filter the analog signal into a filtered signal, a voltage controlled supply regulator configured to convert the filtered signal into a voltage signal, a power amplifier configured to amplify the modulated signal into an amplified signal based on the voltage signal, and an antenna configured to transmit the amplified signal to an external wireless device.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
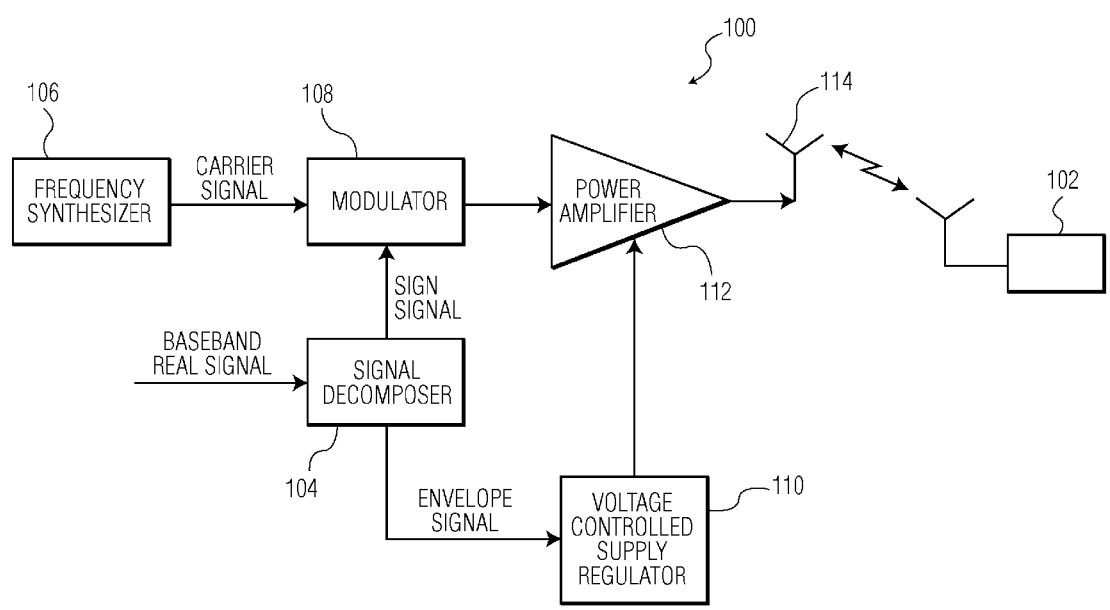
FIG. 1 is a schematic block diagram of a polar transmitter in accordance with an embodiment of the invention.

FIG. 1 is a schematic block diagram of a polar transmitter 100 in accordance with an embodiment of the invention. The polar transmitter is configured to transmit a real signal with a non-constant envelope to at least one external wireless device 102. The polar transmitter can support various RF communications protocols. In an embodiment, the polar transmitter is manufactured according to the physical layer (PHY) specifications of the IEEE 802.15.4 standard and is used for ZigBee wireless mesh networking The polar transmitter can support various modulation schemes, including without limitation, binary phase shift keying (BPSK), amplitude shift keying (ASK), on/off keying (OOK), M-ary pulse amplitude modulations (PAM), and direct sequence spread spectrum (DSSS). The polar transmitter may be used for automobile applications. For example, the polar transmitter is integrated in a car chipset and a car-key chipset.

In the embodiment depicted in FIG. 1, the polar transmitter 100 includes a signal decomposer 104, a frequency synthesizer 106, a modulator 108, a voltage controlled supply regulator 110, a power amplifier 112, and an antenna 114. Although the polar transmitter is depicted and described with certain components and functionality, other embodiments of the polar transmitter may include fewer or more components to implement less or more functionality.

The signal decomposer 104 of the polar transmitter 100 is configured to decompose a baseband real signal into a non-constant envelope signal of the baseband real signal and a sign signal of the baseband real signal. The baseband real signal, the non-constant envelope signal, and the sign signal may be discrete digital signals and are expressed as i[n], s[n], and env[n], respectively, where n represents an index number. In an embodiment, the discrete baseband real signal and the discrete non-constant envelope signal satisfy:

$$\text{env}[n]=\text{abs}(i[n]), \tag{1}$$

where abs( ) represents the absolute value function, which is a mathematical function that returns the absolute value of a real number. In this embodiment, the non-constant envelope signal env[n] is equal to the absolute value of the baseband real signal i[n]. For example, env[n] is equal to 2 when the baseband real signal i[n] is equal to 2 or −2. In an embodiment, the baseband real signal and the sign signal of the baseband real signal satisfy:

$$s[n]=(\text{sign}(i[n])+1)/2, \tag{2}$$

where sign( ) represents the sign function, which is a mathematical function that extracts the sign of a real number. The sign function is also represented as sgn( ). In this embodiment, the sign signal s[n] is equal to one half of the sum of the sign value of the baseband real signal i[n] and one. The sign signal s[n] is equal to one or zero. For example, s[n] is equal to one when the baseband real signal i[n] is equal to two and s[n] is equal to zero when the baseband real signal i[n] is equal to minus two.

The frequency synthesizer 106 of the polar transmitter 100 is configured to provide a carrier signal. Compared to the baseband real signal, the carrier signal has a higher frequency. In an embodiment, the carrier signal has a carrier frequency that is around 868/915 Million (M) Hertz (Hz).

The modulator 108 of the polar transmitter 100 is configured to modulate the carrier signal with the sign signal of the baseband real signal to generate a modulated signal. In an embodiment, the modulator includes at least one transistor gate switch that is controlled by the sign signal of the baseband real signal or a derivative of the sign signal of the baseband real signal.

The voltage controlled supply regulator 110 of the polar transmitter 100 is configured to convert the non-constant envelope signal of the baseband real signal into a voltage signal. The voltage controlled supply regulator may be a DC-DC converter, a linear amplifier, or a linear regulator (LDO). Although a DC-DC converter can have a better power efficiency, a linear implementation of the voltage controlled supply regulator may be preferred in applications with very low spur requirements. Although the voltage controlled supply regulator is shown in FIG. 1 as directly connected to the signal decomposer 104 without any intermediate device, the voltage controlled supply regulator may be connected to the signal decomposer through at least one intermediate device in other embodiments.

The power amplifier 112 of the polar transmitter 100 is configured to amplify the modulated signal from the modulator 108 into an amplified signal based on the voltage signal from the voltage controlled supply regulator 110. By controlling the supply voltage of the power amplifier using the voltage controlled supply regulator, the carrier signal is envelope-modulated. In other words, the carrier signal is modulated by the envelope signal of the baseband real signal in the power amplifier. In an embodiment, the power efficiency of the power amplifier is equal to a ratio between power delivered to a load of the power amplifier and power consumed by the power amplifier.

The antenna 114 of the polar transmitter 100 is configured to transmit the amplified signal from the power amplifier 112 to the external wireless device 102. Although the polar transmitter is shown in FIG. 1 as including a single antenna, the polar transmitter may include multiple antennae in other embodiments.

Modulating a real signal with a non-constant envelope typically requires a RF transmitter to include a linear power amplifier or a nearly-linear power amplifier. However, unlike a saturated power amplifier, a linear power amplifier or a nearly-linear power amplifier usually cannot achieve a high power efficiency. The polar transmitter 100 can utilize a saturated power amplifier in case that the envelope signal of the baseband real signal is restored. In other words, the power amplifier 112 is a saturated power amplifier. For example, the voltage controlled supply regulator 110 tracks the envelope signal of the baseband real signal to generate an output signal and the saturated power amplifier uses the output signal from the voltage controlled supply regulator as the control supply voltage. However, the bandwidth of the voltage controlled supply regulator has to be wide enough to follow the envelope signal. Additionally, to suppress ripples in the output signal from the voltage controlled supply regulator, the switching frequency of the voltage controlled supply regulator has to be kept high. A higher switching frequency results in a higher switching loss and a lower voltage controlled supply regulator efficiency, which results into a low power efficiency of the polar transmitter.

However, the bandwidth limitation in the envelope path of the baseband real signal mainly affects the near-zero envelope regions of the baseband real signal. In the embodiment depicted in FIG. 1, the sign signal of the baseband real signal helps the envelope path of the baseband real signal in the zero crossing regions. Specifically, the sign signal of the baseband real signal restores zero crossing regions of the non-constant envelope signal of the baseband real signal. Because the zero crossing regions of the envelope signal are restored by the sign signal, the envelope-path bandwidth can be lowered. As a result, the switching frequency of the voltage controlled supply regulator 110 can be lowered while the voltage controlled supply regulator still maintains the same ripple rejection and the voltage controlled supply regulator can incur less switching losses without compromising the quality of the output signal of the voltage controlled supply regulator.

In some embodiments, the signal decomposer decomposes 104 the sign signal of the baseband real signal into multiple control signals and the modulator uses the control signals to swap the polarity of the carrier signal from the frequency synthesizer 106. FIGS. 2, 4, 6, and 7 depict embodiments of the polar transmitter 100 depicted in FIG. 1 where the sign signal of the baseband real signal is decomposed into multiple control signals that are used to swap the polarity of the carrier signal from the frequency synthesizer.

Figure 2:
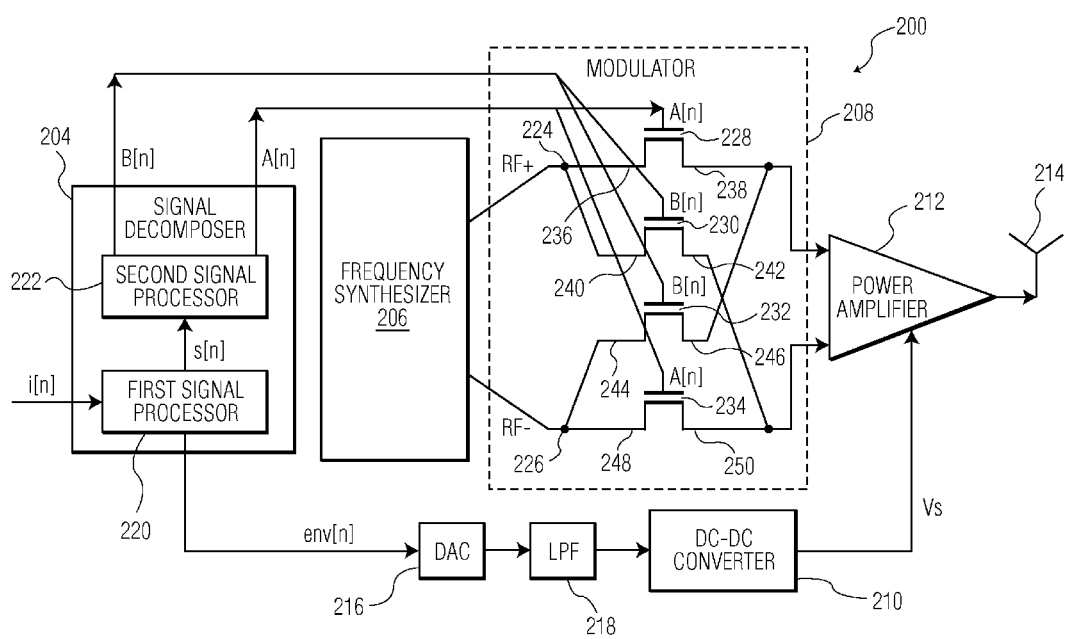
FIG. 2 depicts an embodiment of the polar transmitter depicted in FIG. 1.

FIG. 2 depicts an embodiment of the polar transmitter depicted in FIG. 1. In the embodiment depicted in FIG. 2, a polar transmitter 200 includes a signal decomposer 204, a frequency synthesizer 206, a modulator 208, a DC-DC converter 210, a power amplifier 212, an antenna 214, a digital to analog converter (DAC) 216, and a low pass filter (LPF) 218.

The signal decomposer 204 depicted in FIG. 2 includes a first signal processor 220 and a second signal processor 222. The first signal processor is configured to decompose the baseband real signal i[n] into the non-constant envelope signal env[n] and the sign signal s[n], where n is an index number. The second signal processor is configured to decompose the sign signal s[n] into control signals A[n] and B[n]. In an embodiment, the signals A[n] and B[n] are expressed as:

$$A[n]=s[n], B[n]=\text{not}(s[n]), \text{ for every env}[n] \quad (3)$$

where not( ) represents the NOT logic function that returns the reversed logical value of an input logical value. As a result, the logical value of A[n] is always the opposite of the logical value of B[n]. For example, when s[n] is equal to 1, A[n] is equal to 1 and B[n] is equal to 0. When s[n] is equal to 0, A[n] is equal to 0 and B[n] is equal to 1. In another embodiment, the signals A[n] and B[n] are expressed as:

$$A[n]=0, B[n]=0, \text{ if env}[n] \text{ is zero} \quad (4)$$

$$A[n]=s[n], B[n]=\text{not}(s[n]), \text{ if env}[n] \text{ is not zero} \quad (5)$$

By setting A[n] and B[n] to zero when the envelope signal of the baseband real signal is zero, the zero crossing regions of the envelope signal are restored.

The frequency synthesizer 206 is configured to generate a carrier signal and to output the carrier signal to two terminals 224, 246 of the modulator 208, which are also referred to as terminals "RF+" and "RF−." In an embodiment, the carrier signal is equal to the difference between the signal input at the terminal RF+ and the signal input at the terminal RF−. For example, the carrier signal is represented as v(t), the signal input at the terminal RF+ is represented as $v_0+v(t)/2$, and the input signal at the terminal RF− is represented as $v_0−v(t)/2$. The modulator is configured to modulate the carrier signals that are input into the terminals RF+ and RF− with the control signals A[n] and B[n] from the signal decomposer 204. In the embodiment depicted in FIG. 2, the modulator includes a first transistor switch 228, a second transistor switch 230, a third transistor switch 232, and a fourth transistor switch 234 that are coupled to the terminals RF+ and RF− and the power amplifier 212. The input terminal 236 of the first transistor switch is connected to the input terminal 240 of the second transistor switch. The output terminal 238 of the first transistor switch is connected to the output terminal 246 of the third transistor switch. The output terminal 242 of the second transistor switch is connected to the output terminal 250 of the fourth transistor switch. The input terminal 244 of the third transistor switch is connected to the input terminal 248 of the fourth transistor switch. The first and fourth transistor switches are controlled by the signal A[n] and the second and third transistor switches are controlled by the signal B[n].

The DAC 216 is coupled to the first signal processor 220 of the signal decomposer 204 and to the LPF 218. The DAC is configured to convert the envelope signal env[n] from the first signal processor into an analog signal. The LPF is coupled to the DAC and to the DC-DC converter 210. The LPF is configured to filter high frequency components of the analog signal from the DAC and to output filtered signal to the DC-DC converter. The DAC and the LPF may be optional. For example, the DC-DC converter may include a counter configured to control the duty cycle of the envelope signal env[n] to generate a control signal for the DC-DC converter. The power amplifier 212 and the antenna 214 of the embodiment depicted in FIG. 2 are similar to or the same as the power amplifier 112 and the antenna 114 of the embodiment depicted in FIG. 1.

In an embodiment, the DC-DC converter 210 is configured to convert a battery voltage to a lower voltage without losses. In this case, a first terminal of an inductor is alternatively connected to ground and to the battery voltage. A second terminal of the inductor is connected to a capacitor. The inductor and the capacitor form an LC network, which creates an almost constant voltage on the second terminal of the inductor. The voltage on the second terminal only depends on the battery voltage and the duty cycle of switches that are connected to the LC network. By monitoring the voltage on the second terminal and comparing the voltage on the second terminal to a reference voltage, the operation of the switches is controlled.

Figure 3:
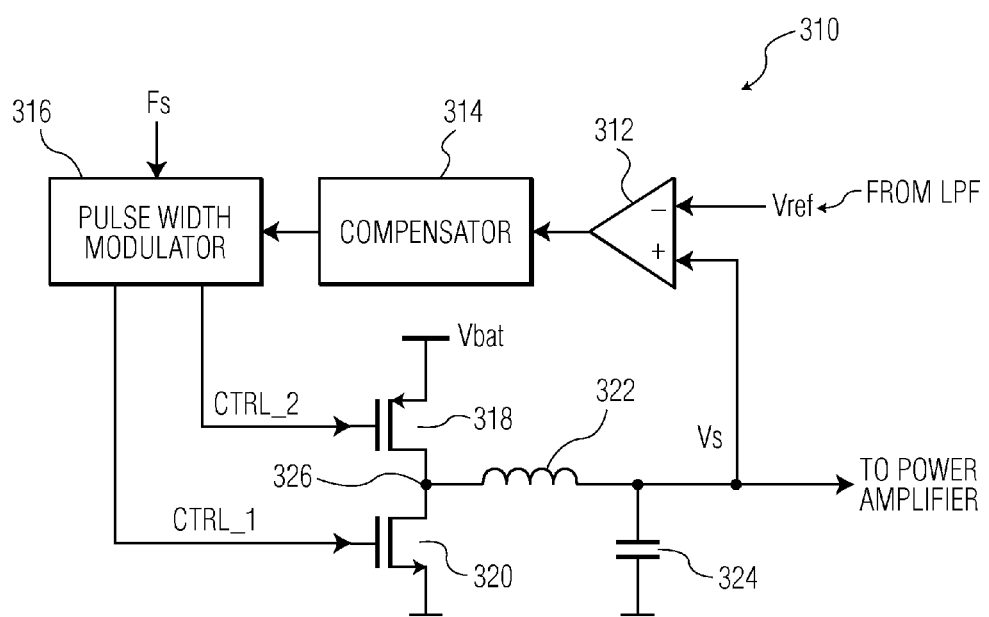
FIG. 3 depicts an embodiment of the direct current to direct current (DC-DC) converter depicted in FIG. 2.

FIG. 3 depicts such an embodiment of the DC-DC converter 210 depicted in FIG. 2. In the embodiment depicted in FIG. 3, a DC-DC converter 310 includes a voltage comparator 312 that is also referred to as an error amplifier, a compensator 314, a pulse width modulator 316, two switches 318, 320, an inductor 322, and a capacitor 324. The voltage comparator/error amplifier is configured to compute the error between the output voltage "$V_s$" from the DC-DC converter and the input reference voltage "$V_{ref}$" from the LPF to the DC-DC converter. The input voltage $V_{ref}$ is generated by digital-to-analog converting and filtering the envelope signal of the baseband real signal. The compensator is configured to compensate the output from the voltage comparator/error amplifier. The compensator is configured to generate a compensation signal to minimize the error between the output voltage $V_s$ and the reference voltage $V_{ref}$. Different kinds of control methods such as linear and non-linear control methods can be used in the compensator. In an embodiment, the compensator is a linear compensator that combines proportional, integral and derivative actions on the error between the output voltage $V_s$ and the reference voltage $V_{ref}$ to provide accuracy, fast settling, and stability for the error compensation. The compensator can be implemented using different techniques such as analog and/or digital signal processing techniques. The pulse width modulator is configured to generate pulse width modulated signals "CTRL_1" and "CTRL_2" under a switching frequency "$F_s$" and a duty-cycle based on the compensation signal from the compensator to control the two switches. The signals CTRL_1 and CTRL_2 are designed to avoid a simultaneous ON state of the two switches. The switch 318 is connected to a battery supply "$V_{bat}$" and the switch 320 is connected to the ground. The two switches are connected at a connecting point 326 that is connected to the inductor. The inductor is connected to the capacitor and an output terminal of the DC-DC converter. The capacitor is connected to the ground. The DC-DC converter outputs the output voltage $V_s$ at the output terminal. The output voltage $V_s$ is proportional to the battery voltage $V_{bat}$ and to the duty cycle of the pulse width modulated signals CTRL_1 and CTRL_2. The output voltage $V_s$ follows the input voltage $V_{ref}$ within the DC-DC converter bandwidth. The switching frequency $F_s$ causes ripples in the output voltage $V_{out}$ and the magnitude of the ripples reversely depends on a ratio between the switching frequency $F_s$ and the bandwidth of the DC-DC converter. The magnitude of the ripples decreases when the ratio between the switching frequency $F_s$ and the bandwidth of the DC-DC converter increases.

In an embodiment, the switching operation of the DC-DC converter 310 is based on the generation of a square-wave voltage signal at the connecting point 326. The square-wave voltage signal has an upper level at the battery supply $V_{bat}$ and a lower level at the ground. This square-wave voltage signal is then filtered by a second order low-pass filter implemented by the inductor 322 and the capacitor 324. Provided that the frequency of the square-wave voltage signal is much higher than the pass-band of the low-pass filter, the output voltage $V_s$ is equal to the DC level of the square-wave voltage signal at the connecting point 326 plus a certain amount of ripple depending on the relationship between the switching frequency $F_s$ and the pass-band of the low-pass filter. A feedback control loop, which includes the voltage comparator/error amplifier 312, the compensator 314, and the pulse width modulator 316, tracks the reference voltage $V_{ref}$ and compensates for the errors between the reference voltage $V_{ref}$ and the output voltage $V_s$.

Figure 4:
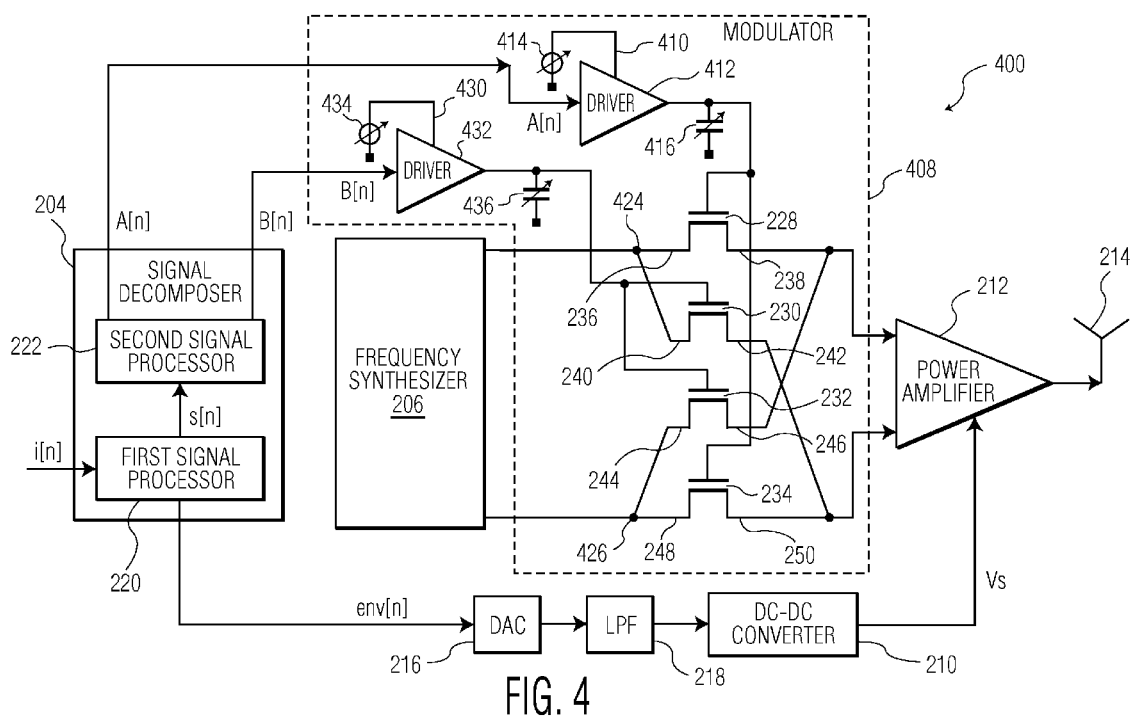
FIG. 4 depicts another embodiment of the polar transmitter depicted in FIG. 1.

FIG. 4 depicts another embodiment of the polar transmitter 100 depicted in FIG. 1. The polar transmitter 400 depicted in FIG. 4 is similar to the polar transmitter 200 depicted in FIG. 2 except that the polar transmitter depicted in FIG. 4 includes a modulator 408 having switch driver circuits 410, 430 for the signals A[n] and B[n]. The switch driver circuit 410 for the signal A[n] includes a driver 412, a voltage source 414 that supplies the driver and is connected to the ground, and a variable capacitor 416 that is connected to the ground. The switch driver circuit 430 for the signal B[n] includes a driver 432, a voltage source 434 that supplies the driver and is connected to the ground, and a variable capacitor 436 that is connected to the ground. The modulator depicted in FIG. 4 includes two terminals 424, 426, which are similar to or the same as the two terminals 224, 226 depicted in FIG. 2. Each of the switch driver circuits behaves like a resistor-capacitor (RC) low pass filter. The transient response of the RC low pass filter can be tuned by adjusting the variable capacitor or by adjusting the voltage source to the driver. Tuning the voltage source $V_{DD}$ to the driver is equivalent to modifying the resistor of the equivalent RC low-pass filter. Compared to the modulator 208 depicted in FIG. 2, the modulator depicted in FIG. 4 can gradually switch the signals A[n] and B[n] by controlling the strength of the switch drivers and the load of the switch drivers. As a result, compared to the polar transmitter depicted in FIG. 2, the polar transmitter depicted in FIG. 4 has a cleaner output spectrum under the same DC-DC converter bandwidth and the same DC-DC converter switching frequency.

Figure 5:
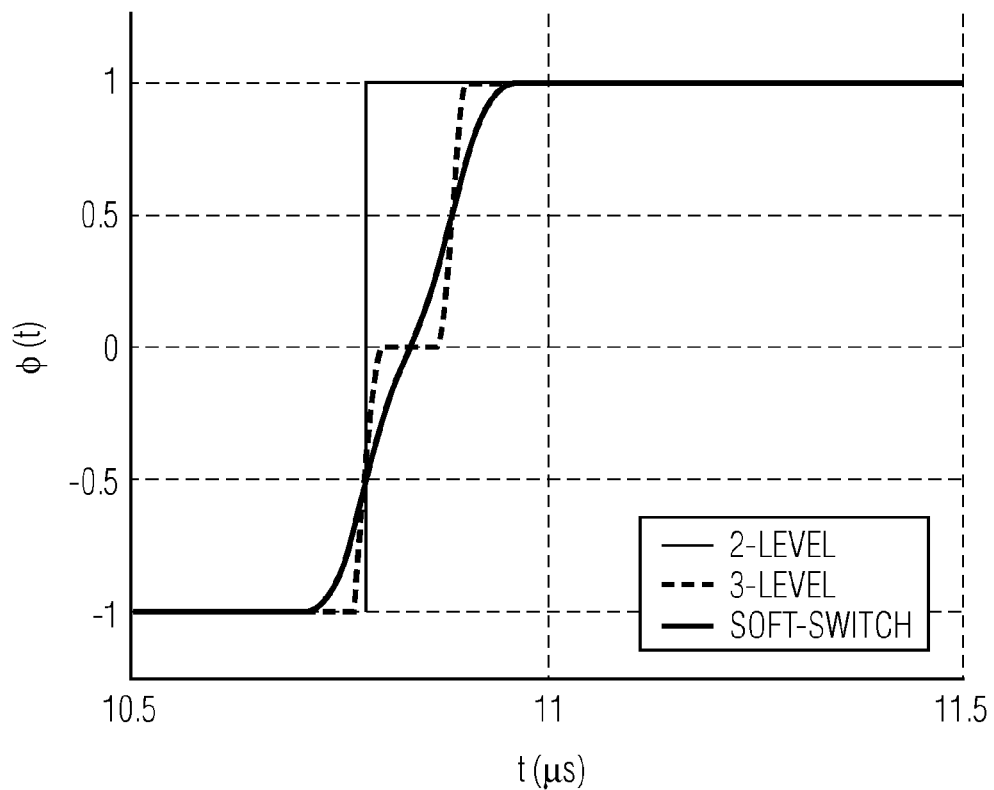
FIG. 5 is a graph showing power amplifier outputs of the polar transmitters of the embodiments depicted in FIGS. 2 and 4.

FIG. 5 is a graph showing power amplifier outputs of the polar transmitters 200, 400 of the embodiments depicted in FIGS. 2 and 4. In the graph of FIG. 5, the x axis represents time and the y axis represents the phase of the output signal of the power amplifier 212. When the polar transmitter of the embodiment depicted in FIG. 2 is used and the signals A[n] and B[n] satisfy the condition specified in equation (3), the carrier signal is either flipped or fed thru. In this case, the phase of the output signal of the power amplifier instantaneously changes from −1 to 1. As a result, the envelope of the output signal of the power amplifier cannot reach the zero level when the bandwidth of the DC-DC converter 210 is limited. When the polar transmitter of the embodiment depicted in FIG. 2 is used and the signals A[n] and B[n] satisfy the condition specified in equations (4) and (5), the input signal to the power amplifier becomes zero when the envelope of the baseband real signal reaches zero. As a result, the envelope of the output signal of the power amplifier can reach zero when the bandwidth of the DC-DC converter is limited. When the polar transmitter of the embodiment depicted in FIG. 4 is used, the phase transition of the output signal of the power amplifier carrier signal is gradual. As a result, the envelope of the output signal of the power amplifier can be close to zero when the bandwidth of the DC-DC converter is limited.

Figure 6:
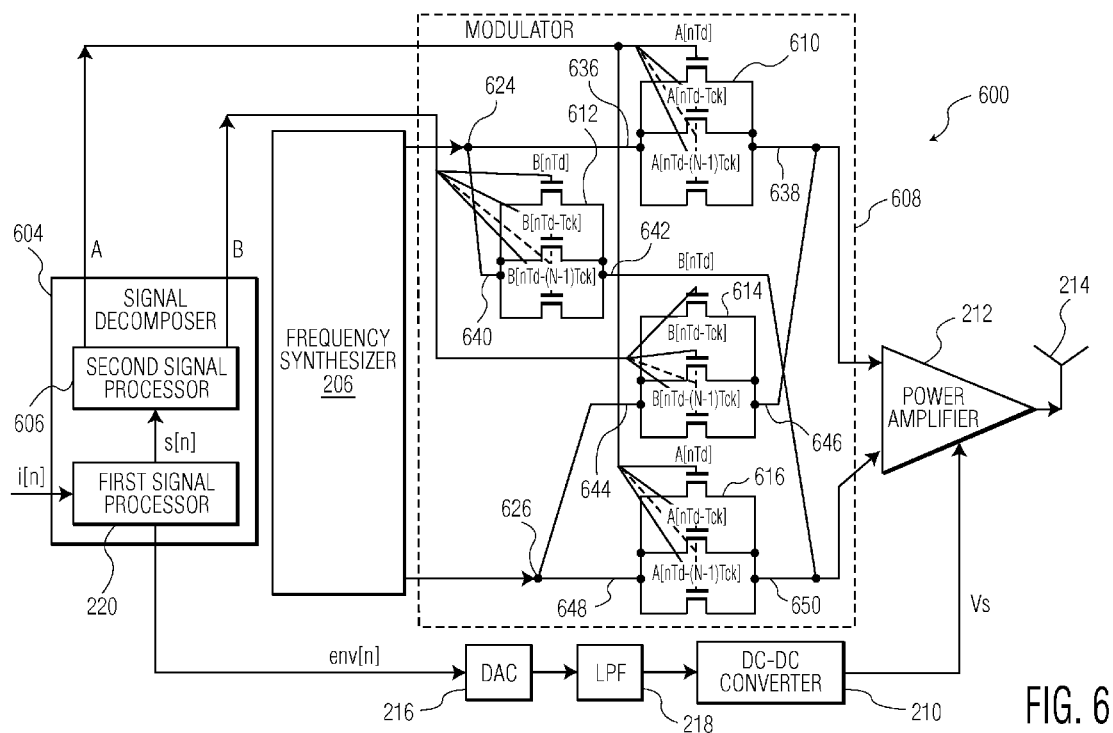
FIG. 6 depicts another embodiment of the polar transmitter depicted in FIG. 1.

FIG. 6 depicts another embodiment of the polar transmitter 100 depicted in FIG. 1. The polar transmitter 600 depicted in FIG. 6 is similar to the polar transmitter 200 depicted in FIG. 2. One difference is that the polar transmitter depicted in FIG. 6 includes a signal decomposer 604 that includes a second signal processor 606 that is configured to decompose the sign signal s[n] of the baseband real signal i[n] into a first series of signals A and a second series of signals B. The first series of signals A includes N signals $A[nT_d], A[nT_d-T_{ck}], \ldots, A[nT_d-(N-1)T_{ck}]$ and the second series of signals B includes N signals $B[nT_d], B[nT_d-T_{ck}], \ldots, B[nT_d-(N-1)T_{ck}]$, where n represents an index number, N is an integer that is larger than zero, $T_d$ represents a scale time period, and $T_{ck}$ represents a step time period. In an embodiment, $T_d$ is much larger than $T_{ck}$ so that the change caused by the step time period is small compared to the original time stamp. Another difference between the polar transmitter depicted in FIG. 6 and the polar transmitter depicted in FIG. 2 is that the polar transmitter depicted in FIG. 6 includes a modulator 608 that includes four sets of switches 610, 612, 614, 616 that are controlled by the series of signals A and the series of signals B from the signal decomposer. The four sets of switches are coupled to terminals 624, 626 of the modulator and the power amplifier 212. The two terminals 624, 626 depicted in FIG. 6 are similar to or the same as the two terminals 224, 226 depicted in FIG. 2. The input terminal 636 of the first set of switches is connected to the input terminal 640 of the second set of switches. The output terminal 638 of the first set of switches is connected to the output terminal 646 of the third set of switches. The output terminal 642 of the second set of switches is connected to the output terminal 650 of the fourth set of switches. The input terminal 644 of the third set of switches is connected to the input terminal 648 of the fourth set of switches. Each set of switches includes N transistor switches that can be replaced by controllable resistors. Each of the N transistor switches is controlled by one of $A[nT_d]$, $B[nT_d]$, a delayed version of $A[nT_d]$ and a delayed version of $B[nT_d]$. By adjusting the series of signals A or the series of signals B at the signal decomposer, the speed in which a set of switches open or close can be adjusted.

Figure 7:
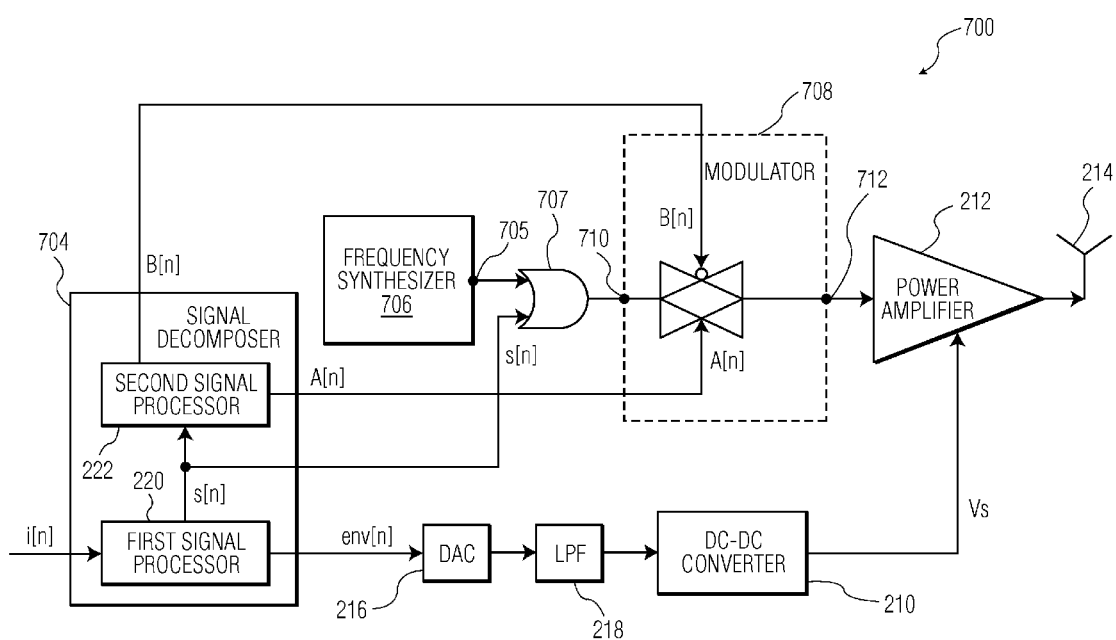
FIG. 7 depicts another embodiment of the polar transmitter depicted in FIG. 1.

FIG. 7 depicts another embodiment of the polar transmitter 100 depicted in FIG. 1. The polar transmitter 700 depicted in FIG. 7 is similar to the polar transmitter 200 depicted in FIG. 2 except that the polar transmitter of the embodiment depicted in FIG. 7 includes a signal decomposer 704 that outputs the sign signal s[n] of the baseband real signal i[n]. Another difference between the polar transmitter depicted in FIG. 7 and the polar transmitter depicted in FIG. 2 is that the polar transmitter depicted in FIG. 7 includes a frequency synthesizer 706 that includes a single output terminal 705 through which a carrier signal is output. Another difference between the polar transmitter depicted in FIG. 7 and the polar transmitter depicted in FIG. 2 is that the polar transmitter depicted in FIG. 7 includes an OR gate circuit 707 configured to perform the OR logic function on the carrier signal from the frequency synthesizer and the sign signal from the signal decomposer and to output the OR logic function result to a modulator 708 of the polar transmitter. The modulator depicted in FIG. 7 is similar to the modulators 208, 408, 608 of the embodiment depicted in FIGS. 2, 4, and 6 except that the modulator depicted in FIG. 7 includes a single input terminal 710 and a single output terminal 712.

Figure 8:
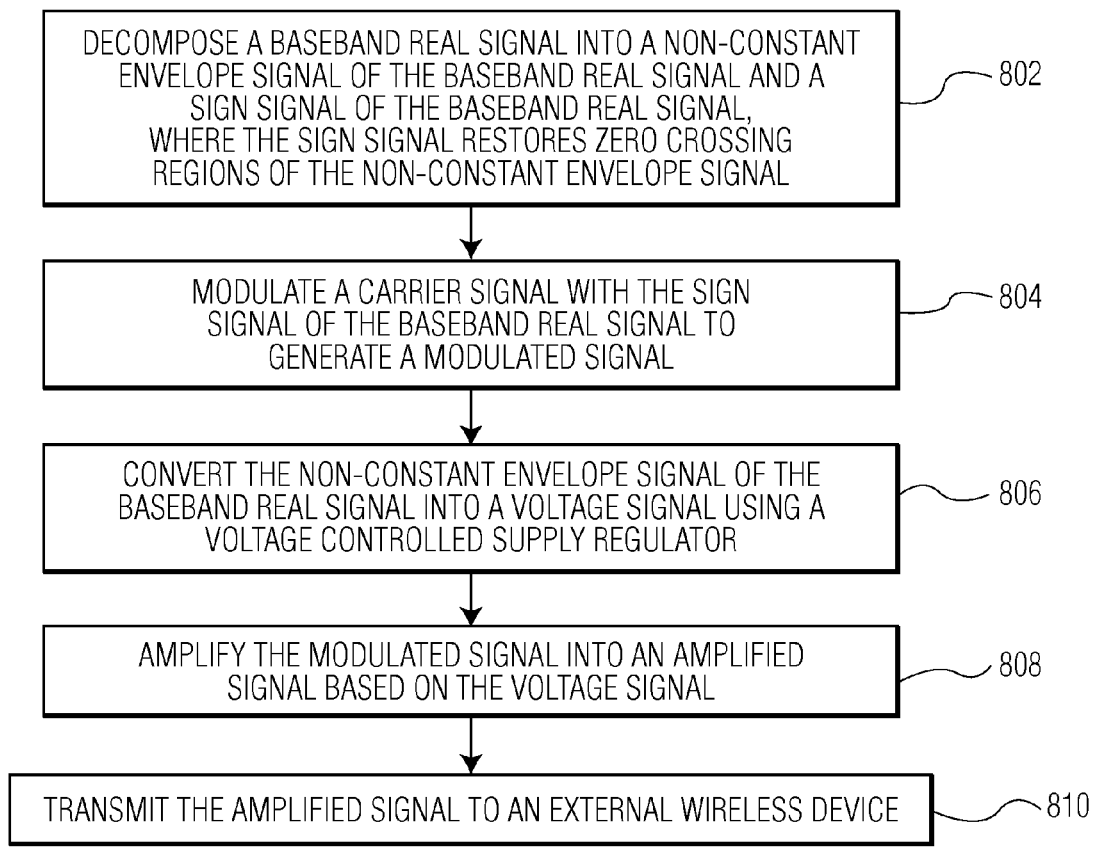
FIG. 8 is a process flow diagram of a method for transmitting a baseband real signal with a non-constant envelope using a polar transmitter in accordance with an embodiment of the invention.

FIG. 8 is a process flow diagram of a method for transmitting a baseband real signal with a non-constant envelope using a polar transmitter in accordance with an embodiment of the invention. At block 802, a baseband real signal is decomposed into a non-constant envelope signal of the baseband real signal and a sign signal of the baseband real signal, where the sign signal restores zero crossing regions of the non-constant envelope signal. At block 804, a carrier signal is modulated with the sign signal of the baseband real signal to generate a modulated signal. At block 806, the non-constant envelope signal of the baseband real signal is converted into a voltage signal using a voltage controlled supply regulator. At block 808, the modulated signal is amplified into an amplified signal based on the voltage signal. At block 810, the amplified signal is transmitted to an external wireless device.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for transmitting a baseband real signal with a non-constant envelope using a polar transmitter, the method comprising:
    decomposing a baseband real signal into a non-constant envelope signal of the baseband real signal and a sign signal of the baseband real signal, wherein the sign signal restores zero crossing regions of the non-constant envelope signal;
    modulating a carrier signal with the sign signal of the baseband real signal to generate a modulated signal;
    converting the non-constant envelope signal of the baseband real signal into a voltage signal using a voltage controlled supply regulator;
    amplifying the modulated signal into an amplified signal based on the voltage signal; and
    transmitting the amplified signal to an external wireless device.

2. The method of claim 1, wherein decomposing the baseband real signal into the non-constant envelope signal of the baseband real signal and the sign signal of the baseband real signal comprises decomposing a discrete baseband real signal into a discrete non-constant envelope signal and a discrete sign signal, and wherein the discrete baseband real signal and the discrete non-constant envelope signal satisfy:

$$env[n]=abs(i[n]),$$

where i[n] represents the discrete baseband real signal, env[n] represents the discrete non-constant envelope signal, n represents an index number, and abs( ) represents the absolute value function.

3. The method of claim 2, wherein the discrete sign signal and the discrete non-constant envelope signal satisfy:

$$s[n]=(sign(i[n])+1)/2,$$

where s[n] represents the discrete sign signal and sign( ) represents the sign function.

4. The method of claim 1 further comprising decomposing the sign signal of the baseband real signal into multiple control signals, wherein modulating the carrier signal with the sign signal of the baseband real signal comprises swapping polarity of the carrier signal using the control signals.

5. The method of claim 1, wherein decomposing the baseband real signal into the non-constant envelope signal of the baseband real signal and the sign signal of the baseband real signal comprises decomposing a discrete baseband real signal into a discrete non-constant envelope signal and a discrete sign signal, the method further comprising decomposing the discrete sign signal into multiple discrete control signals, and wherein modulating the carrier signal with the sign signal of the baseband real signal comprises controlling multiple switches using the multiple discrete control signals.

6. The method of claim 5, wherein the discrete sign signal, the non-constant envelope signal, and the multiple discrete control signals satisfy:

$$A[n]=s[n], B[n]=\text{not}(s[n]),$$

where s[n] represents the discrete sign signal, n represents an index number, not( ) represents the NOT logic function, and A[n] and B[n] represent the multiple discrete control signals.

7. The method of claim 5, wherein the discrete sign signal, the non-constant envelope signal, and the multiple discrete control signals satisfy:

$$A[n]=0, B[n]=0, \text{ if env}[n] \text{ is zero}$$

$$A[n]=s[n], B[n]=\text{not}(s[n]), \text{ if env}[n] \text{ is not zero}$$

where s[n] represents the discrete sign signal, env[n] represents the discrete non-constant envelope signal, n represents an index number, not( ) represents the NOT logic function, and A[n] and B [n] represent the multiple discrete control signals.

8. The method of claim 5, wherein decomposing the discrete sign signal into the multiple discrete control signals comprises decomposing the discrete sign signal into a first series of discrete signals and a second series of discrete signals, wherein the first series of discrete signals includes a first discrete signal and at least one delayed version of the first discrete signal, wherein the second series of discrete signals includes a second discrete signal and at least one delayed version of the second discrete signal, and wherein controlling the multiple switches using the multiple discrete control signals comprises controlling two sets of switches of the multiple switches using the first series of discrete signals and controlling another two sets of switches of the multiple switches using the second series of discrete signals.

9. A polar transmitter for transmitting a baseband real signal with a non-constant envelope, the polar transmitter comprising:
- a signal decomposer configured to decompose a baseband real signal into a non-constant envelope signal of the baseband real signal and a sign signal of the baseband real signal, wherein the sign signal restores zero crossing regions of the non-constant envelope signal;
- a frequency synthesizer configured to provide a carrier signal;
- a modulator configured to modulate the carrier signal with the sign signal of the baseband real signal to generate a modulated signal;
- a voltage controlled supply regulator configured to convert the non-constant envelope signal of the baseband real signal into a voltage signal;
- a power amplifier configured to amplify the modulated signal into an amplified signal based on the voltage signal; and
- an antenna configured to transmit the amplified signal to an external wireless device.

10. The polar transmitter of claim 9, wherein the signal decomposer is further configured to decompose a discrete baseband real signal into a discrete non-constant envelope signal and a discrete sign signal, and wherein the discrete baseband real signal and the discrete non-constant envelope signal satisfy:

$$\text{env}[n]=\text{abs}(i[n]),$$

where i[n] represents the discrete baseband real signal, env[n] represents the discrete non-constant envelope signal, n represents an index number, and abs( ) represents the absolute value function.

11. The polar transmitter of claim 10, wherein the discrete sign signal and the discrete non-constant envelope signal satisfy:

$$s[n]=(\text{sign}(i[n])+1)/2,$$

where s[n] represents the discrete sign signal and sign( ) represents the sign function.

12. The polar transmitter of claim 9, wherein the signal decomposer is configured to decompose a discrete baseband real signal into a discrete non-constant envelope signal and a discrete sign signal and to decompose the discrete sign signal into multiple discrete control signals, wherein the modulator comprises multiple switches, and wherein the modulator is further configured to control the multiple switches using the multiple discrete control signals.

13. The polar transmitter of claim 12, wherein the discrete sign signal, the non-constant envelope signal, and the multiple discrete control signals satisfy:

$$A[n]=s[n], B[n]=\text{not}(s[n]),$$

where s[n] represents the discrete sign signal, n represents an index number, not( ) represents the NOT logic function, and A[n] and B[n] represent the multiple discrete control signals.

14. The polar transmitter of claim 12, wherein the discrete sign signal, the non-constant envelope signal, and the multiple discrete control signals satisfy:

$$A[n]=0, B[n]=0, \text{ if env}[n] \text{ is zero}$$

$$A[n]=s[n], B[n]=\text{not}(s[n]), \text{ if env}[n] \text{ is not zero}$$

where s[n] represents the discrete sign signal, env[n] represents the discrete non-constant envelope signal, n represents an index number, not( ) represents the NOT logic function, and A[n] and B[n] represent the multiple discrete control signals.

15. The polar transmitter of claim 12, wherein the signal decomposer is configured to decompose the discrete sign signal into a first series of discrete signals and a second series of discrete signals, wherein the first series of discrete signals includes a first discrete signal and at least one delayed version of the first discrete signal, wherein the second series of discrete signals includes a second discrete signal and at least one delayed version of the second discrete signal, and wherein the modulator is further configured to control two sets of switches of the multiple switches using the first series of discrete signals and to control another two sets of switches of the multiple switches using the second series of discrete signals.

16. The polar transmitter of claim 12, wherein the modulator includes a first transistor switch, a second transistor switch, a third transistor switch, and a fourth transistor switch that are coupled to the frequency synthesizer and the power amplifier, wherein an input terminal of the first transistor switch is connected to an input terminal of the second transistor switch, wherein an output terminal of the first transistor switch is connected to an output terminal of the third transistor switch, wherein an output terminal of the second transistor switch is connected to an output terminal of the fourth transistor switch, wherein an input terminal of the third transistor switch is connected to an input terminal of the fourth transistor switch, wherein the first and fourth transistor switches are controlled by one discrete control signal of the multiple discrete control signals, and wherein the second and third transistor switches are controlled by another discrete control signal of the multiple discrete control signals.

17. The polar transmitter of claim 9, wherein the modulator comprises switch driver circuits for the multiple discrete control signals, and wherein each of the switch driver circuits comprises a driver, a voltage source connected to the ground and configured to supply the driver, and a variable capacitor.

18. The polar transmitter of claim 9 further comprising an OR gate circuit coupled to the modulator and configured to perform an OR logic function on the carrier signal and the sign signal of the baseband real signal.

19. A polar transmitter for transmitting a discrete baseband real signal with a non-constant envelope, the polar transmitter comprising:
- a signal decomposer configured to decompose a discrete baseband real signal into a discrete non-constant envelope signal and a discrete sign signal and to decompose the discrete sign signal into multiple discrete control signals, wherein the multiple discrete control signals restores zero crossing regions of the non-constant envelope signal;
- a frequency synthesizer configured to provide a carrier signal;
- a modulator configured to modulate the carrier signal with the sign signal of the baseband real signal to generate a modulated signal;
- a digital to analog converter configured to convert the discrete non-constant envelope signal into an analog signal;
- a low pass filter configured to filter the analog signal into a filtered signal;
- a voltage controlled supply regulator configured to convert the filtered signal into a voltage signal;
- a power amplifier configured to amplify the modulated signal into an amplified signal based on the voltage signal; and
- an antenna configured to transmit the amplified signal to an external wireless device.

20. The polar transmitter of claim 19, wherein the modulator comprises multiple switches, wherein the modulator is further configured to control the multiple switches using the multiple discrete control signals, and wherein the discrete baseband real signal, the discrete sign signal, the discrete non-constant envelope signal, and the multiple discrete control signals satisfy:

$$env[n]=abs(i[n]),$$

$$s[n]=(sign(i[n])+1)/2,$$

$$A[n]=0, B[n]=0, \text{ if env}[n] \text{ is zero}$$

$$A[n]=s[n], B[n]=not(s[n]), \text{ if env}[n] \text{ is not zero}$$

where $i[n]$ represents the discrete baseband real signal, $env[n]$ represents the discrete non-constant envelope signal, $s[n]$ represents the discrete sign signal, n represents an index number, abs( ) represents the absolute value function, sign( ) represents the sign function, not( ) represents the NOT logic function, and $A[n]$ and $B[n]$ represent the multiple discrete control signals.

* * * * *